United States Patent [19]

Shibuya

[11] Patent Number: 4,855,633
[45] Date of Patent: Aug. 8, 1989

[54] PIEZOELECTRIC ACTUATOR
[75] Inventor: Tsuyoshi Shibuya, Chofu, Japan
[73] Assignee: Tokyo Juki Industrial Co., Ltd., Chofu, Japan
[21] Appl. No.: 225,616
[22] Filed: Jul. 25, 1988

Related U.S. Application Data

[63] Continuation of Ser. No. 945,665, Dec. 23, 1986, abandoned.

[30] Foreign Application Priority Data

Dec. 25, 1985 [JP] Japan ............................ 60-202179[U]

[51] Int. Cl.$^4$ ............................................. H01L 41/08
[52] U.S. Cl. ...................................................... 310/328
[58] Field of Search ................................. 310/323, 328

[56] References Cited

U.S. PATENT DOCUMENTS

| | | | |
|---|---|---|---|
| 3,649,857 | 3/1972 | Knappe et al. | 310/328 |
| 4,435,666 | 3/1984 | Fukui et al. | 310/328 |
| 4,518,887 | 5/1985 | Yano et al. | 310/328 |
| 4,547,086 | 10/1985 | Matsumoto et al. | 310/328 X |
| 4,644,213 | 2/1987 | Shibuya | 310/328 |
| 4,647,808 | 3/1987 | Shibuya | 310/328 |

FOREIGN PATENT DOCUMENTS

| | | | |
|---|---|---|---|
| 0187980 | 11/1982 | Japan | 310/328 |
| 0175387 | 10/1984 | Japan | 310/328 |

Primary Examiner—Mark O. Budd
Attorney, Agent, or Firm—Morgan & Finnegan

[57] ABSTRACT

A piezo-electric actuator magnifies piezoelectric displacement through two-steps, provided by a first lever portion and a second lever portion which are connected by two plate springs. One of the plate springs transmits a tension force while the other plate spring located adjacent to the first plate spring works as a fulcrum. A higher magnifying power of displacement is obtained.

2 Claims, 2 Drawing Sheets

PIEZOELECTRIC ACTUATOR

This is a continuation of co-pending application Ser. No. 945,665, filed on Dec. 23, 1986, now abandoned.

BACKGROUND OF THE INVENTION

The invention relates to an actuator employing piezoelectric elements and more particularly to an actuator apparatus for magnifying the piezoelectric effect.

Referring to FIG. 2, one conventional type of actuator employing a piezoelectric element will be explained. Numeral 21 denotes a "U" shaped panel frame providing a longer arm 21*l* and a shorter arm 21*s*. Frame 21 provides fixing holes 21*h*. Action levers 22 and 23 are connected forming a "J" shape, and are extended from the longer arm 21*l* via thin hinge portions 24 and 25, respectively.

A laminated piezoelectric element 26 has one end fixed to the shorter arm 21*s* and another end fixed to the action lever 22 via a thin hinge portion 27 which is extended from the action lever 22. Numeral 28 denotes a wire having one end fixed to the end of action lever 23.

In construction, the above-described actuator may be press-formed as one unit, except for its piezoelectric element 26 and the wire 28.

With the above-described conventional actuator (FIG. 2), when piezoelectric element 26 expands, action lever 22 tends to rotate clockwise keeping the hinge 24 as a fulcrum. Due to this rotation, the action lever 23 is rotated clockwise keeping the hinge 25 as a fulcrum, and the wire 28 moves upwardly. Displacement D of the wire 28 is expressed by the following formula:

$$D = \Delta l \times \frac{b}{a} \times \frac{d}{c} \quad (1), \text{ where}$$

$\Delta l$ = the displacement of the piezoelectric element;
a = the distance between hinge 24 and hinge 27;
b = the distance between hinge 24 and hinge 25;
c = the distance from hinge 25 to supporting end of the action lever 23; and
d = the distance from the hinge 25 to the wire 28.

For example, if $\Delta l = 10$ μm (1 μm = 0.001 mm), a = 5 mm, b = 20 mm, c = 5 mm, and d = 40 mm, the displacement D of the wire 28 becomes 320 μm. Thus, the actuator of FIG. 2, having the given measurements, has a "magnifying power" of 32.

Since the action levers 22, 23 are extended from the longer arm 21*l* via the thin hinge portions (fulcrums) 24, 25 respectively, to get increased magnifying power from the piezoelectric effect of element 26, actuators of the type illustrated in FIG. 2 needed to have a wider size as a whole, and accordingly such actuators became more bulky in size and heavier in weight.

It is therefore an object of the invention to obtain an actuator adaptable for increased power while maintaining a compact size and a light weight.

SUMMARY OF THE INVENTION

These and other objects of the invention are met by providing an actuator comprising a first action lever, a frame, and a second action lever. The first action lever is extended from the frame via a thin elastic hinge. The end of the first action lever is connected to the end of the second action lever via a first flexible body. The second action lever is connected to the frame via a second flexible body. One end of the piezoelectric element is fixed to the frame and another end is fixed to the first action lever via the thin elastic hinge portion of the first action lever.

BRIEF DESCRIPTION OF THE DRAWINGS

The invention will be described in greater detail below by way of reference to the following drawings, in which.

DETAILED DESCRIPTION OF THE DRAWINGS

Figure 1A:
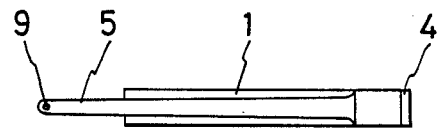
FIG. 1A is a top view of an actuator according to one embodiment of the invention.
Figure 1B:
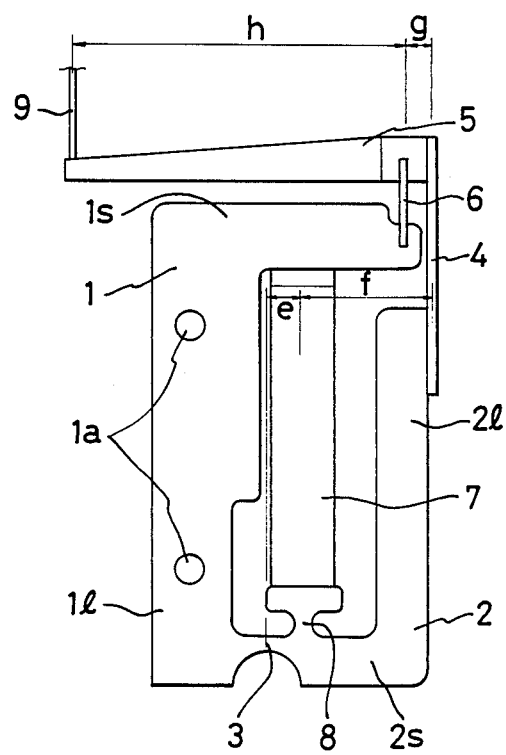
FIG. 1B is a front view of an actuator according to one embodiment of the invention.

Referring to FIGS. 1A and 1B, one embodiment of the invention will be explained hereafter. FIG. 1A is a top view of an actuator according to the invention and FIG. 1B is a front view of an actuator according to the invention.

Shown in FIGS. 1A and 1B is an "L" shaped panel frame 1 having fixing holes 1*a* and a first action lever 2 having its shorter side 2*s* extended from a longer side 1*l* of the panel frame 1 via a first hinge 3. The longer side 2*l* of the first action lever 2 is connected to the end of a second action lever 5 via a flexible body 4, which is made of spring steel such as maraging steel. Said second action lever 5 is connected to a shorter side 1*s* of the panel frame 1 via a second flexible body 6 which may also be made of spring steel such as maraging steel. Also illustrated in FIG. 1B is a piezoelectric element 7 having one end fixed to the shorter side 1*s* of the panel frame 1 and another end connected to the shorter side 2*s* of the first action lever 2 via a second hinge 8. Numeral 9 denotes a wire, one end of which is fixed to the end of the second action lever 5.

The above-described actuator of FIGS. 1A and 1B may be press-formed as one unit (except for the flexible bodies 4 and 6, the second action lever 5, the piezoelectric element 7, and the wire 9) and its material may be an alloyed steel with a low expansion-coefficient.

Referring to FIG. 1B, when the piezoelectric element 7 expands, the first action lever 2 rotates clockwise keeping the hinge 3 as the center. Due to this rotation, the plate spring 4 tends to rotate clockwise and also tends to be pulled downwardly, and instaneously the upper portion of the plate spring 6 tends to turn rightwardly. Consequently, the second action lever 5 rotates clockwise keeping the plate spring 6 as the center. In this case, the plate spring 6 serves as a fulcrum and accordingly the lever ratio of the action lever becomes considerably high.

Displacement DW of the wire 9 in the embodiment of FIGS. 1A and 1B may be expressed using the following formula:

$$DW = \Delta d \times \frac{f}{e} \times \frac{h}{g} \quad (2), \text{ where}$$

$\Delta d$ = the displacement of the piezoelectric element 7;
e = the distance between the hinge 3 and the hinge 8;
f = the distance between the hinge 8 and the plate spring 4;
g = the distance between the plate spring 4 and the plate spring 6; and h = the distance between the plate spring 6 and the wire 9.

Figure 2:
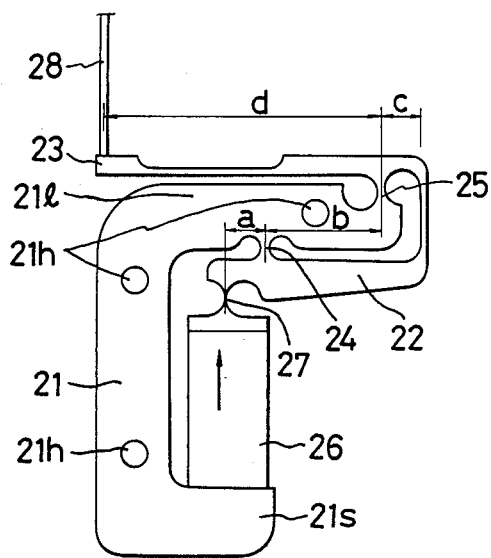
FIG. 2 is a front view of a conventional actuator.

If a magnifying power of 32 is required (as was provided by the conventional type of actuator described above with reference to FIG. 2), an embodiment of the invention may be adapted to provide this same magnifying factor using a 10 μm displacement of the piezoelectric element ($\Delta d = 10$ μm), and actuator dimensions of e=16 mm, f=5.7 mm, g=1 mm, and h=9 mm. Comparing these dimensions with the convention (FIG. 2) type of actuator having a magnifying power of 32, as described above, whose dimensions were a=5 mm, b=20 mm, c=5 mm, d=40 mm, it is apparent that the instant invention is very effective to minimize the size of the actuator while providing the same degree of magnifying power.

Moreover, in conventional types of actuators (referring again to FIG. 2), stress works at the hinge 25 in a direction normal to the line connecting the hinge 24 and hinge 25, and considerably high bending stress is present.

However, according to the invention, the stress at the fulcrum portion which supports the second lever by the second flexible body 6 works in a direction normal to the line connecting the said fulcrum portion and the right-tip end of the first action lever. Since this direction of stress is almost parallel with the second actio lever 5, the bending stress at the fulcrum portion is reduced, and accordingly the durability of the actuator of the invention is improved.

Thus, according to the invention, the displacement magnifying portions of the actuator are separately located, and the piezoelectric element is inserted therebetween in the direction of its expansion. The size of the actuator is thereby minimized although its magnifying power is large, and a higher degree of durability of the actuator is expected.

As many apparently widely different embodiments of the invention may be made without departing the spirit and scope therein, it is to be understood that the invention is not limited to the specific embodiment herein described, but should only be interpreted in accordance with the appended claims.

What is claimed is:

1. An actuator, comprising:
an L-shaped frame;
a first action lever, shaped substantially as an L, disposed with a first leg thereof substantially in parallel with a first leg of said L-shaped frame, and a second leg of said first action lever being substantially parallel to a second leg of said L-shaped frame, the second leg of said first action lever being extended from a tip portion of said first leg of said L-shaped frame via a first hinge which is formed by narrowing said tip portion of said first leg in a direction substantially perpendicular to the first leg of the frame and substantially parallel to a second leg of the frame;
a second action lever disposed substantially in parallel with the second leg of said L-shaped frame and on a side of said leg opposite the second leg of said first action lever, said second action lever being connected to the second leg of the frame by a flexible body which is projected from the second leg of the frame;
a piezoelectric element disposed with its direction of expansion substantially parallel to said first leg of said L-shaped frame, one end of said piezoelectric element being fixed to the second leg of the frame and the other end of said piezoelectric element being connected to the second leg of said first action lever via a second hinge located substantially adjacent the narrowed tip portion; and
a second flexible body disposed substantially in parallel with said first leg of said L-shaped frame, said second flexible body connecting said first action lever with said second action lever.

2. An actuator comprising:
an L-shaped frame;
first displacement magnifying means being extended via a narrowed hinge from a tip portion of a first leg of said L-shaped frame;
second displacement magnifying means being joined to a tip portion of a second leg of said L-shaped frame, on a side of said second leg opposite said first displacement magnifying means, via a first flexible body;
a piezoelectric element provided between said second leg of said L-shaped frame and said first displacement magnifying means, said piezoelectric element having a direction of expansion between said second leg and said first displacement magnifying means; and
a second flexible body which connects said first displacement magnifying means and said second displacement magnifying means, said second flexible body being disposed substantially parallel to the first flexible body.

* * * * *